United States Patent
Gorman

(10) Patent No.: US 8,779,066 B2
(45) Date of Patent: Jul. 15, 2014

(54) PROCESS FOR BROMINATING BUTADIENE POLYMERS USING ESTER SOLVENT MIXTURES

(75) Inventor: David B. Gorman, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 225 days.

(21) Appl. No.: 13/131,603

(22) PCT Filed: Dec. 7, 2009

(86) PCT No.: PCT/US2009/067036
§ 371 (c)(1),
(2), (4) Date: May 26, 2011

(87) PCT Pub. No.: WO2010/080286
PCT Pub. Date: Jul. 15, 2010

(65) Prior Publication Data
US 2014/0121330 A1    May 1, 2014

(51) Int. Cl.
*C08F 36/06* (2006.01)
*C08C 19/12* (2006.01)
*C08F 36/16* (2006.01)

(52) U.S. Cl.
CPC .................. *C08C 19/12* (2013.01); *C08F 36/06* (2013.01); *C08F 36/16* (2013.01)
USPC ..................................... 525/332.3; 525/359.1

(58) Field of Classification Search
None
See application file for complete search history.

(56) References Cited

U.S. PATENT DOCUMENTS

| | | | |
|---|---|---|---|
| 5,334,680 A | 8/1994 | Mukai | |
| 7,851,558 B2 * | 12/2010 | King et al. | 525/331.9 |
| 2008/0064774 A1 | 3/2008 | Stobby | |
| 2008/0287559 A1 | 11/2008 | King et al. | |
| 2009/0008236 A1 * | 1/2009 | Leng et al. | 203/45 |
| 2009/0292079 A1 | 11/2009 | Murray et al. | |
| 2010/0004402 A1 | 1/2010 | King et al. | |
| 2010/0317757 A1 | 12/2010 | King et al. | |

FOREIGN PATENT DOCUMENTS

| | | |
|---|---|---|
| EP | 565075 A | 10/1993 |
| WO | 2007058736 A | 5/2007 |
| WO | 2008021417 A | 2/2008 |
| WO | 2008021418 A | 2/2008 |
| WO | 2009108453 A | 9/2009 |

\* cited by examiner

*Primary Examiner* — Robert C Boyle
(74) *Attorney, Agent, or Firm* — Gary C Cohn PLLC

(57) ABSTRACT

Butadiene copolymers are brominated using certain quaternary ammonium or phosphonium tribromides as the brominating agent. The bromination is performed in solution in a mixture of n-butyl acetate and ethyl acetate. The bromination process proceeds easily under mild conditions, and produces a brominated product that has excellent thermal stability.

5 Claims, No Drawings

PROCESS FOR BROMINATING BUTADIENE POLYMERS USING ESTER SOLVENT MIXTURES

This application claims priority from U.S. Provisional Application No. 61/139,085, filed 19 Dec. 2008.

The present invention relates to a process for brominating butadiene copolymers.

Brominated polybutadiene polymers and copolymers have been identified as potential flame retardants for polystyrene foam or other polymers. A problem with the brominated butadiene polymers and copolymers is that, unless carefully synthesized, they are not thermally stable enough to withstand the temperature conditions that are encountered in melt processing operations. The bromination process by which these materials are prepared can have a very large effect on the thermal stability of the brominated polymer or copolymer.

WO 2008/021417 describes a process by which a butadiene copolymer is brominated using a quaternary ammonium tribromide as a brominating agent. The bromination is performed in the presence of a solvent. According to WO 2008/021417, suitable solvents include ethers such as tetrahydrofuran; halogenated alkanes such as carbon tetrachloride, chloroform, dichloromethane, bromochloromethane and 1,2-dichloroethane; hydrocarbons such as cyclohexane, cyclopentane, cyclooctane and toluene; and halogenated aromatic compounds such as bromobenzene, chlorobenzene and dichlorobenzene. Because of a concern over reducing the thermal stability of the brominated polymer, WO 2008/021417 expresses a preference for solvents that do not contain oxygen. The process described in WO 2008/021417 is capable of forming brominated butadiene polymers that have very good thermal stability, when the bromination is performed in a halogenated solvent.

An advantage of using the halogenated solvents in the process described in WO 2008/021417 is that those solvents are very amenable to a continuous process. The quaternary ammonium tribromide is converted to the corresponding quaternary ammonium monobromide salt as the butadiene polymer is brominated. The quaternary ammonium monobromide salt has little solubility in the halogenated solvents. Because of this, the quaternary ammonium monobromide salt can be separated from the brominated butadiene polymer via an aqueous extraction process. The tribromide can be regenerated by contacting the quaternary ammonium monobromide salt with elemental bromine in an aqueous environment. The quaternary ammonium tribromide that is regenerated can be extracted from the aqueous phase using the halogenated solvent. These extraction processes can be operated continuously or semi-continuously, which can lead to an efficient, low cost manufacturing process. In addition, these extraction processes permit one to minimize the amount of the expensive tertiary ammonium compounds that are needed to operate the process. The halogenated solvents therefore provide benefits in process economics as well as in the quality of the brominated butadiene polymer.

There is a desire to move away from the halogenated solvents and hydrocarbon solvents that are described in WO 2008/021417. This is mainly due to environmental or worker exposure issues (as in the case of halogenated solvents), and to a desire to reduce reliance on fossil-based resources (as is the case with many of the hydrocarbons). However, any solvent that replaces the halogenated and hydrocarbon solvents should provide similar benefits—that is, the solvent should allow a brominated polymer product with good thermal stability to be produced, the process should provide high conversions to brominated polymer under mild reaction conditions; and, preferably, the solvent should be compatible with a continuous or semi-continuous operation.

Various ester compounds can be prepared using feedstocks such as carbohydrates that are obtained from annually renewable resources. These esters are also essentially free of halogens, which reduces environmental or worker exposure concerns.

Esters have been used as solvents for various bromination reactions in which small molecules are brominated. Dioxane, methanol and ethyl acetate are described in KR 803291 as solvents for the bromination of 3,5-bis[(bisdimethylcarbamoyl)oxy]acetophenone, using elemental bromine as the brominating agent. In JP 2004-051591, a 2-alkoyxpyridine is brominated in the presence of ethyl acetate and sodium acetate, using elemental bromine as the brominating agent. US 2002045783 describes a method of preparing hexabromocyclododecane by brominating a precursor material in the presence of Br⁻ ion and certain water-miscible solvents, which may include ester compounds. JP 2001-1213846 describes brominating t-butyl 4-methylbiphenyl-2-carboxylate in the presence of a fatty acid ester solvent, using N-bromosuccinimide as the brominating agent. Ethyl acetate has been used as the solvent in the bromination of benzyl compounds and methylquinolines, using elemental bromine or N-bromosuccinimide as the brominating agent. Cyclobutanones have been halogenated with elemental bromine in the presence of ethyl acetate.

The present invention is a process comprising brominating a butadiene polymer by contacting the butadiene polymer with a solution of at least one phenyltrialkylammonium tribromide, benzyltrialkylammonium tribromide, tetraalkylammonium tribromide or quaternary phosphonium tribromide in an n-butyl acetate/ethyl acetate solvent mixture, under conditions sufficient to brominate at least 85 percent of non-aromatic carbon-carbon double bonds in the butadiene polymer.

The n-butyl acetate/ethyl acetate solvent mixture provides for a facile bromination of a butadiene polymer with a tertiary ammonium or phosphonium tribromide brominating agent. The bromination can proceed to a high conversion under mild or moderate conditions and in commercially reasonable reaction times. The brominated polymers tend to exhibit excellent thermal stability, as indicated by a thermal gravimetric analysis (TGA) method described below. Brominated polymers made in accordance with the invention often exhibit 5% weight loss temperatures, determined according to the TGA method described below, of above 240° C. and often 250° C. or more, even at a conversion of 90% or more of the butadiene units of the starting polymer. In particular, little or no measurable bromination occurs on aromatic groups that may be present in the starting polymer. Fewer than 5% of the bromine groups introduced into the polymer are bound to allylic or tertiary carbon atoms or are otherwise weakly bound into the polymer. At most, only very low levels of oxygen-containing impurities are introduced to the butadiene polymer.

The solvent mixture is suitable for use in a continuous or semi-continuous process, because quaternary ammonium or phosphonium monobromide salts which form as a by-product of the bromination reaction have little solubility in the n-butyl acetate/ethyl acetate solvent mixture. As a result, aqueous extraction methods can be used to recover the monobromide salt by-products from the brominated butadiene polymer solution. The quaternary ammonium or phosphonium tribromide can be regenerated from the monobromide salt by reaction with elemental bromine; the tribromides, being more soluble in the n-butyl acetate/ethyl acetate solvent mixture than in water, can be extracted from the aqueous phase in a continuous or semi-continuous fashion to regenerate the quaternary ammonium or phosphonium tribromide solution.

Another advantage of the invention is that the n-butyl acetate/ethyl acetate solvent mixture is also a good solvent for many butadiene polymers as well as the brominated butadiene polymer.

The starting polymer in the process of the invention is a homopolymer or copolymer of butadiene. Preferred among these are copolymers of butadiene and at least one vinyl aromatic monomer. Such a copolymer may be a random, block or graft copolymer. A "vinyl aromatic" monomer is an aromatic compound having a polymerizable ethylenically unsaturated group bonded directly to a carbon atom of an aromatic ring. Vinyl aromatic monomers include unsubstituted materials such as styrene and vinyl naphthalene, as well as compounds that are substituted on the ethylenically unsaturated group (such as, for example alpha-methylstyrene) and/or are ring-substituted. Ring-substituted vinyl aromatic monomers include those having halogen, alkoxyl, nitro or unsubstituted or substituted alkyl groups bonded directly to a carbon atom of an aromatic ring. Examples of such ring-substituted vinyl aromatic monomers include 2- or 4-bromostyrene, 2- or 4-chlorostyrene, 2- or 4-methoxystyrene, 2- or 4-nitrostyrene, 2- or 4-methylstyrene and 2,4-dimethylstyrene. Preferred vinyl aromatic monomers are styrene, alpha-methyl styrene, para-methyl styrene, and mixtures thereof.

A useful starting butadiene polymer contains at least 10% by weight of polymerized butadiene. Butadiene polymerizes to form two types of repeating units. One type, referred to herein as "1,2-butadiene units", takes the form

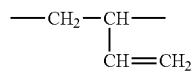

and so introduce pendant unsaturated groups to the polymer. The second type, referred to herein as "1,4-butadiene" units, take the form —CH$_2$—CH=CH—CH$_2$— and introduce unsaturation into the main polymer chain. A starting butadiene polymer preferably contains at least some 1,2-butadiene units. Of the butadiene units in the starting butadiene polymer, at least 10%, preferably at least 15% and more preferably at least 20% and even more preferably at least 25% are 1,2-butadiene units. 1,2-butadiene units may constitute at least 50%, at least 55%, at least 60% or at least 70% of the butadiene units in the starting butadiene polymer. The proportion of 1,2-butadiene units may be in excess of 85% or even in excess of 90% of the butadiene units in the starting polymer.

Methods for preparing butadiene polymers with controlled 1,2-butadiene content are described by J. F. Henderson and M. Szwarc in *Journal of Polymer Science* (D, Macromolecular Review), Volume 3, page 317 (1968), Y. Tanaka, Y. Takeuchi, M. Kobayashi and H. Tadokoro in *J. Polym. Sci.* A-2, 9, 43-57 (1971), J. Zymona, E. Santte and H. Harwood in *Macromolecules*, 6, 129-133 (1973), and H. Ashitaka, et al., in *J. Polym. Sci., Polym. Chem.*, 21, 1853-1860 (1983).

Styrene/butadiene copolymers are especially preferred, particularly when the bulk polymer in which the brominated butadiene polymer will be used is a styrene homopolymer or copolymer. Styrene/butadiene block copolymers that are useful as the starting polymer include those available from Dexco Polymers under the trade designation VECTOR™. Styrene/butadiene random copolymers may be prepared in accordance with the processes described by A. F. Halasa in *Polymer*, Volume 46, page 4166 (2005). Styrene/butadiene graft copolymers may be prepared in accordance with methods described by A. F. Halasa in *Journal of Polymer Science* (Polymer Chemistry Edition), Volume 14, page 497 (1976). Styrene/butadiene random and graft copolymers may also be prepared in accordance with methods described by Hsieh and Quirk in chapter 9 of *Anionic Polymerization Principles and Practical Applications*, Marcel Dekker, Inc., New York, 1996.

A starting butadiene polymer may also contain repeating units formed by polymerizing monomers other than butadiene and a vinyl aromatic monomer. Such other monomers include olefins such as ethylene and propylene, acrylate or acrylic monomers such as methyl methacrylate, methyl acrylate, acrylic acid, and the like. These monomers may be randomly polymerized with the vinyl aromatic monomer and/or butadiene, may be polymerized to form blocks, or may be grafted onto the starting butadiene copolymer.

The most preferred type of starting butadiene polymer is a block copolymer containing one or more polystyrene blocks and one or more polybutadiene blocks. Among these, diblock and triblock copolymers are especially preferred.

The brominating agent is a phenyltrialkylammonium tribromide, benzyltrialkylammonium tribromide, a tetraalkylammonium tribromide or a quaternary phosphonium tribromide. Examples of suitable quaternary ammonium tribromides include phenyltrimethylammonium tribromide, benzyltrimethylammonium tribromide, tetramethylammonium tribromide, tetraethylammonium tribromide, tetrapropylammonium tribromide, tetra-n-butylammonium tribromide and the like. A suitable quaternary phosphonium tribromide has a quaternary phosphonium group that can be represented by the formula $R_4P^+$, where each R is a hydrocarbon group. The quaternary phosphonium tribromide may be a tetraalkylphosphonium tribromide, in which case each of the R groups is alkyl. The four R groups can all be the same. Alternatively, there may two, three or even four different R groups attached to the phosphorus atom. The R groups each are preferably alkyl groups each having from one to 20 carbon atoms. The R groups more preferably are alkyl groups each having from 1 to 8 carbon atoms. Examples of specific quaternary phosphonium tribromides include tetramethylphosphonium tribromide, tetraethylphosphonium tribromide, tetra(n-propyl)phosphonium tribromide, tetra(n-butyl)phosphonium tribromide, tetrahexylphosphonium tribromide, tetraoctylphosphonium tribromide, trihexyltetradecylphosphonium tribromide and the like, or mixtures thereof.

The tribromide brominating agent can be prepared by mixing the corresponding quaternary ammonium monobromide salt or quaternary phosphonium monobromide salt with elemental bromine. The monobromide salt is usually water-soluble, so a convenient way of making the tribromide is to add elemental bromine to an aqueous solution of the monobromide salt. This reaction occurs well at approximately room temperature, but higher or lower temperatures can be used if desired. The tribromide tends to precipitate from the aqueous phase, and so may be recovered from the liquid phase by any convenient solid-liquid separation method. The quaternary ammonium or phosphonium tribromide is soluble in an n-butyl acetate/ethyl acetate mixture, and may be dissolved in such a solvent mixture if desired to facilitate blending with the starting butadiene polymer. The solvent mixture or either component thereof can be used to extract the quaternary ammonium or phosphonium tribromide from the aqueous phase. Such an extraction step can be done continuously or semi-continuously.

In addition, the tribromide may be formed in situ in the presence of the starting butadiene polymer, which may or may not be dissolved in the solvent mixture. This process has the advantage of using less of the expensive compound that serves to carry the bromine added to the polymer and is preferred. As elemental bromine is consumed in this reaction sequence, more bromine may be added to the reaction mixture continuously or intermittently to reproduce the tribromide and maintain the reaction.

The bromination reaction is conducted with the quaternary ammonium or phosphonium tribromide in solution in a mixture of n-butyl acetate and ethyl acetate. The weight ratio of the solvents is selected to provide good solubility for the tribromide brominating agent. Preferably, the starting butadiene polymer is also soluble in the solvent mixture in the relative amounts present during the bromination reaction. Ratios of the components of the solvent mixture may be varied if necessary so that the starting butadiene polymer is soluble in the solvent mixture. The solvent mixture preferably contains n-butyl acetate and ethyl acetate in a weight ratio of about 30:70 to 90:10. A more preferred solvent mixture contains n-butyl acetate and ethyl acetate in a weight ratio of from 50:50 to 85:15. Still more preferred is a weight ratio of 60:40 to 75:25.

The reaction is conducted by mixing the starting butadiene polymer with the tribromide brominating agent solution and allowing the mixture to react until the desired proportion of butadiene units have been brominated. The tribromide brominating agent may be dissolved into the solvent mixture while in the presence of the starting butadiene polymer, by adding the solvent mixture to a mixture of the tribromide brominating agent and starting butadiene polymer mixture. It is also possible to form the tribromide solution in the presence of the starting butadiene polymer by adding elemental bromine to the corresponding quaternary ammonium or phosphonium monobromide salt in the presence of the solvent and the starting butadiene polymer.

The solvent is used in quantities sufficient to dissolve the quaternary ammonium or phosphonium tribromide and preferably the starting butadiene polymer under the conditions of the reaction. The concentration of the starting butadiene polymer in the solvent may range from, for example, 1 to 50% by weight, especially from 5 to 35% by weight. About 0.5 to about 5 moles of the tribromide brominating agent are suitably used per mole of butadiene units in the copolymer; a more suitable amount is from about 0.9 to about 2.5 moles/mole and an even more suitable amount is from 1 to 1.5 moles/mole.

Generally, only mild to moderate conditions are needed to effect the bromination. Bromination temperatures can range from −20 to 100° C., and are preferably from 0 to 90° C. and especially from 10 to 85° C. Temperatures higher than 100° C. could be used, but are not necessary and may lead to a loss of selectivity and/or an increase in by-products. The tribromide becomes converted to the corresponding quaternary ammonium monobromide salt or quaternary phosphonium monobromide salt as the bromination reaction proceeds.

The starting butadiene polymer is kept in contact with the quaternary ammonium or phosphonium tribromide solution for a time sufficient to achieve the desired amount of bromination. Typically, the reaction is continued until at least 90% and more preferably until at least 95% of the butadiene units in the copolymer have been brominated. Up to 100% of the butadiene units can be brominated. More typically, up to 97%, up to 98% or up to 99% of the butadiene units can be brominated in a commercially reasonable time period under the mild-to-moderate reaction conditions described above. The extent of bromination can be determined using proton NMR methods. Residual double bond percentage, polymerized styrene monomer content and 1,2 isomer content can be determined by comparing integrated areas of signals due to appropriate protons (residual double bond protons are between 4.8 and 6 ppm relative to tetramethylsilane (TMS), styrene aromatic protons are between 6.2-7.6 ppm, and protons for brominated polybutadiene are between 3.0 and 4.8 ppm). A Varian INOVA™ 300 NMR spectrometer or equivalent device is useful for such determinations, being operated with a delay time of 10-30 seconds to maximize relaxation of protons for quantitative integrations. A deutero-substituted solvent such as deutero-chloroform or d5-pyridine is suitable for diluting the sample for NMR analysis.

The starting butadiene polymer may become less soluble in the reaction mixture as the butadiene polymer becomes brominated, and may partially or entirely precipitate from the solvent mixture. However, it is generally preferred to operate the process such that the brominated butadiene polymer will be at least partially and preferably entirely dissolved in the solvent. In some cases, some or all of the quaternary ammonium or phosphonium monobromide salts that form during the reaction may precipitate from the solvent mixture, or may migrate to an aqueous phase, if one is present during the reaction.

The bromination reaction can be conducted in either a continuous or batch reactor. Continuous reactors are generally preferred when reaction kinetics are fast because they are smaller and thus less costly. Surge vessels between unit operations are generally smaller as well. If desired, multiple reactors can be used in parallel or in series.

The bromination reaction produces a crude reaction mixture containing the brominated butadiene polymer, solvent and quaternary ammonium or quaternary phosphonium monobromide (unless the tribromide is continuously regenerated by adding elemental bromine into the reaction mixture). Some residual quaternary ammonium tribromide or quaternary phosphonium tribromide may be present even if no bromine is added during the reaction. An aqueous phase may be present in some embodiments of the invention. The crude reaction mixture may contain small quantities of other materials. The quaternary ammonium or phosphonium monobromide salt has little solubility in the solvent mixture, and so tends to precipitate from the crude reaction mixture, unless an aqueous phase is present. If an aqueous phase is present, the quaternary ammonium or phosphonium monobromide may become dissolved in the aqueous phase, in which case the crude reaction mixture may form a two-phase system or an emulsion which may contain, in addition to the organic and aqueous phases, some undissolved quaternary ammonium or phosphonium monobromide salt and/or undissolved brominated butadiene polymer.

The brominated butadiene polymer is recovered from the solution or slurry and separated from the residual quaternary ammonium or phosphonium compound(s). In the usual case, in which the quaternary ammonium or phosphonium compounds are mainly in the form of the monobromide salts, an extraction process is very useful for removing the brominated butadiene polymer from the quaternary ammonium or phosphonium compounds. The extraction is performed by contacting the brominated butadiene polymer solution or slurry with an aqueous phase. Because the quaternary ammonium or phosphonium monobromide salts are much more soluble in water than in the solvent mixture, they will partition to the aqueous phase. The brominated butadiene polymer has little solubility in the aqueous phase, and so remains with the solvent mixture. The aqueous phase used in the extraction step preferably contains a reducing agent. The reducing agent converts any residual quaternary ammonium or phosphonium tribromides, which are soluble in the solvent mixture, to the corresponding monobromide salts, which are less soluble in the solvent mixture but more soluble in the aqueous phase. This increases the efficiency of the extraction, ensuring high recovery of the valuable quaternary ammonium or phosphonium monobromide salt.

Following the extraction step, the organic phase, still containing the brominated butadiene polymer, can be sent to downstream operations for recovery of the product. The aqueous quaternary ammonium or phosphonium monobromide solution obtained from the extraction step can be contacted with bromine and more of the n-butyl acetate/ethyl acetate solvent mixture (or a component thereof) to regenerate the corresponding quaternary ammonium or phosphonium tribromide. The bromine can be added as a solution in the solvent mixture. However, it is preferred to add the bromine separately from the bulk of the solvent. The quaternary ammonium or phosphonium tribromide that is regenerated in this manner partitions into the organic phase, forming a solution of the quaternary ammonium or phosphonium tribromide.

The differing solubilities of the tribromides and monobromides can form the basis for a semi-continuous or continuous process. The semi-continuous or continuous process includes an extraction process to produce the quaternary ammonium or phosphonium tribromide, and another extraction process to separate the quaternary ammonium or phosphonium monobromide salt from the brominated polymer.

Therefore, in a preferred embodiment, the bromination process comprises a. contacting the starting butadiene polymer with a solution of the quaternary ammonium or phosphonium tribromide in the n-butyl acetate/ethyl acetate solvent mixture under conditions such that the starting butadiene polymer and the quaternary ammonium tribromide react to produce a brominated butadiene polymer and a quaternary ammonium or phosphonium monobromide byproduct and a solution or slurry of the brominated butadiene polymer in the solvent mixture is formed in the reaction, b. continuously or semi-continuously contacting the solution or slurry of the brominated butadiene polymer with an aqueous phase to form an aqueous quaternary ammonium or phosphonium monobromide salt solution or slurry and a washed solution or slurry of the brominated butadiene polymer, and c. continuously or semi-continuously contacting the aqueous quaternary ammonium or phosphonium monobromide salt solution or slurry obtained in step b with elemental bromine and a mixture of n-butyl acetate and ethyl acetate to form an aqueous raffinate stream and a solution of the quaternary ammonium or phosphonium tribromide in the mixture of n-butyl acetate and ethyl acetate, and d. recycling the quaternary ammonium or phosphonium tribromide solution obtained in step c into step a.

An emulsion may be formed during an aqueous extraction step, and/or if an aqueous phase is present during the bromination reaction. If such an emulsion forms, one product recovery approach is to recover the brominated butadiene polymer directly from the emulsion. The remaining liquid phase, containing both water and the solvent mixture, then can be discarded or, preferably, contacted with elemental bromine to regenerate the quaternary ammonium or phosphonium tribromide salt, as in step c above. Another alternative is to break the emulsion before removing the brominated butadiene polymer, to form separate organic and aqueous phases. The brominated butadiene polymer then can be recovered from the solvent phase and the aqueous phase, containing the quaternary ammonium or phosphonium monobromide salts, can be sent to regenerate a solution of the tribromide salt in the solvent mixture as in step c above.

The brominated butadiene polymer can be recovered from the solvent mixture by stripping the solvent from the brominated butadiene polymer, by precipitating the brominated butadiene polymer from the solvent followed by a liquid-solid separation step, or by other suitable means. A convenient stripping process includes a steam stripping step, in which steam is contacted with the brominated butadiene polymer solution to supply energy to volatilize the solvent. This is preferably done by forming the solution into droplets, and exposing the droplets to steam. This produces particles of the brominated butadiene polymer, which can be cooled if necessary below the glass transition temperature of the polymer to form small particles. However, other solvent stripping methods can also be used.

An alternative method of recovering the brominated butadiene polymer from the reaction solution is through the addition of an antisolvent such as a lower alcohol, which, when added to the brominated butadiene polymer solution, causes the brominated butadiene polymer to precipitate as a solid. Isopropanol is a particularly useful antisolvent for this purpose. The solid polymer can be separated from the solvent phase by a solid-liquid separation technique such as filtration or centrifugation.

A bromination reaction conducted in accordance with the invention tends to be highly selective, in several respects. Little or no bromination occurs on aromatic rings that may be present in the starting polymer. Otherwise, bromination tends to take place at the carbon-carbon double bonds of both 1,2- and 1,4-butadiene units, and bromination tends to take place so that little bromination occurs at allylic or tertiary carbon atoms. It is believed that the bromination occurs through an ionic mechanism rather than a free radical mechanism that tends to introduce unwanted bromine at allylic and tertiary carbon atoms. These allylic and tertiary bromines are believed to adversely affect the temperature stability of the brominated copolymer.

The process of the invention tends to produce brominated butadiene polymer products that have excellent thermal stability. A useful indicator of thermal stability is a 5% weight loss temperature, which is measured by thermogravimetric analysis as follows: 10 milligrams of the polymer is analyzed using a TA Instruments model Hi-Res TGA 2950 or equivalent device, with a 60 milliliters per minute (ml/min) flow of gaseous nitrogen and a heating rate of 10° C./min over a range of from room temperature (nominally 25° C.) to 600° C. The mass lost by the sample is monitored during the heating step, compared to the weight at 100° C. (due to the loss of volatiles), and the temperature at which the sample has lost 5% of its initial weight is designated the 5% weight loss temperature (5% WLT). This method provides a temperature at which a sample undergoes a cumulative weight loss of 5 wt %, based on initial sample weight. The brominated copolymer preferably exhibits a 5% WLT of at least 240° C., and more preferably at least 250° C. Brominated butadiene polymers in which at least 90% or at least 95% of the butadiene units have been brominated, and which have such 5% WLT values, are of particular interest.

A further increase in thermal stability is sometimes seen if the brominated butadiene polymer is treated with an alkali metal base, as described in WO 08/021,417.

A brominated butadiene polymer made in accordance with the invention is useful as a flame retardant additive for a variety of organic bulk polymers. Bulk polymers of interest include vinyl aromatic or alkenyl aromatic polymers (including alkenyl aromatic homopolymers, alkenyl aromatic copolymers, or blends of one or more alkenyl aromatic homopolymers and/or alkenyl aromatic copolymers), as well as other polymers in which the brominated copolymer is soluble or can be dispersed to form domains of less than 25 µm, preferably less than 10 µm, in size. Enough of the brominated copolymer is preferably present in the blend to provide the blend with a bromine content within a range of from 0.1 percent by weight to 25 percent by weight, based upon blend weight.

A mixture of the brominated polymer and the bulk polymer may be melt processed. Melt processing, for purposes of this invention, involves creating a melt of the bulk polymer and the brominated butadiene polymer, shaping the melt in some manner, and then cooling the shaped melt to solidify it and form an article. Examples of these melt processing operations include extrusion, injection molding, compression molding, casting, and the like. The melt processing operation of most interest is extrusion foaming. In each case, the melt processing operation can be conducted in any convenient manner. The melt processing operation can be conducted in a manner that is entirely conventional, but for the presence of the brominated butadiene polymer.

Other additives which may be present during the melt processing operation include, for example, lubricants such as barium stearate or zinc stearate; UV stabilizers, pigments, nucleating agents, plasticizers, FR synergists, IR blockers, and the like, as may be useful in the particular melt processing operation.

Extrusion foaming is performed by forming a pressurized melt that contains the bulk polymer, the brominated butadiene polymer, a blowing agent and other additives such as may be useful. Once the raw materials have been mixed and the polymers melted, the resulting gel is forced through an opening into a zone of lower pressure, where the blowing agent expands and the polymer solidifies to form a foam. The extruded foam can take the form of a sheet (having a thickness of up to ½ inch (12 mm)), plank or boardstock (having a thickness of from ½ inch (12 mm) to 12 inches (30 cm) or more), or other convenient shape. The foam can be extruded to form coalesced strand foam if desired.

The various raw materials can be fed into the processing equipment individually or in various combinations. The bulk polymer and brominated butadiene polymer can be melt-blended prior to the melt processing operation, and the molten mixture or particles of the blend can be introduced into the melt processing operation. It is generally preferred to introduce the blowing agent as a separate stream after the polymeric materials have been melted.

When making an extruded foam, a blowing agent is used to provide a gas which generates the cells and expands the molten mixture after it passes through the die. The blowing agent may be a physical (endothermic) or chemical (exothermic) type, or a combination of both. Physical blowing agents include carbon dioxide, nitrogen, air, water, argon, C2-C8 hydrocarbons such as the various cyclic and acyclic isomers of butane or pentane, alcohols such as ethanol, and various ethers, esters, ketones, hydrofluorocarbons, chlorofluorocarbons, hydrochlorofluorocarbons and the like. Chemical blowing agents include the so-called "azo" expanding agents, certain hydrazide, semi-carbazide, and nitroso compounds, sodium hydrogen carbonate, sodium carbonate, ammonium hydrogen carbonate and ammonium carbonate, as well as mixtures of one or more of these with citric acid. Another suitable type of expanding agent is encapsulated within a polymeric shell.

The amount of blowing agent that is used is sufficient to impart the desired density to the foam. The extruded polymer foam suitably has a foam density of from about 1 to about 30 pounds per cubic foot (pcf) (16-480 kg/m$^3$), especially from about 1.2 to about 10 pcf (19.2 to 160 kg/m$^3$) and most preferably from about 1.2 to about 4 pcf (19.2 to 64 kg/m$^3$).

Other materials may be present during an extrusion foaming process and in the resulting extruded polymer foam. These include melt flow promoters, other FR agents (including hexabromocyclododecane), other halogenated FR agents and/or non-halogenated FR agents, FR synergists, IR attenuators, corrosion inhibitors, colorants, stabilizers, nucleating agents, preservatives, biocides, antioxidants, fillers, reinforcing agents and the like. These and other additives can be used if desired or necessary for the particular product or in the particular melt processing operation.

The article produced in the melt processing operation can be used in the same manner as similar articles made in other melt processing operations. When the article is a foam, the foam preferably has a density of up to 80 kg/m$^3$, more preferably up to 64 kg/m$^3$ and even more preferably up to 48 kg/m$^3$. Foam that is used as thermal insulation is preferably in the form of boardstock having a density of from 24 to 48 kg/m$^3$. Billet foam preferably has a density of from 24 to 64 kg/m$^3$, more preferably from 28 to 48 kg/m$^3$. The foams preferably have an average cell size in the range of from 0.1 mm to 4.0 mm, especially from 0.1 to 0.8 mm, per ASTM D3576. The foam may be predominantly closed-celled, i.e., may contain 30% or less, preferably 10% or less and even more preferably 5% or less of open cells, per ASTM D6226-05. More open-celled foams also may be produced in accordance with the invention.

Boardstock foams made in accordance with the invention are useful as building foam insulation, as part of roof or wall assemblies. Other foams made in accordance with the invention can be used as decorative billet, pipe insulation and in molded concrete foundation applications.

The following example is provided to illustrate the invention, but not to limit the scope thereof. All parts and percentages are by weight unless otherwise indicated.

EXAMPLE

To a 500 mL round-bottom flask equipped with a bottom drain, nitrogen inlet and overhead stirring are added 91 g of deionized water and 103 g (0.25 mol) of tetraethylammonium monobromide salt. 32 g (0.20 mol) of bromine is added to the reactor contents, with stirring, over a period of less than one minute. The exotherm that results as tetraethylammonium tribromide is formed raises the temperature of the reactor contents from 20 to 27° C. 103 g of n-butyl acetate is added, followed by 154 g of ethyl acetate. After the ethyl acetate addition is completed, the tetraethylammonium tribromide dissolves completely, and two separate liquid phases (an organic phase and an aqueous phase) form in the reactor. The reactor contents are transferred to an addition funnel and the liquid phases are allowed to separate into a lower aqueous phase and an upper organic phase, which contains the tetraethylammonium tribromide. The aqueous phase is drained from the funnel and preserved.

20 g of a polystyrene-polybutadiene block copolymer (54% by weight polybutadiene, 0.20 moles of butadiene repeating units) are dissolved in 257 g of n-butyl acetate. The resulting solution is heated to 87° C. in a 2-L round bottom flask equipped with the addition funnel containing the tetraethylammonium tribromide solution, an overhead stirrer and a nitrogen inlet. The tetraethylammonium tribromide solution is added to the block copolymer solution over a period of about 20 minutes. This reduces the temperature of the reactor contents to about 74° C. After stirring for one hour at between 74 and 86° C., the preserved aqueous layer from the tribromide formation step is added to the reaction vessel, lowering the temperature to 66° C. The reactor contents are stirred at 66° C. for about another hour, at which time 23 g of a 10% solution of sodium bisulfite in water is added. The aqueous layer and organic layers are separated. 213 g of deionized water are added to the organic layer to form an emulsified mixture. The mixture is added to 1003 g of 2-propanol to precipitate the brominated polymer. The resulting slurry is filtered, and the solids are washed with 437 g of 2-propanol. The filter cake is dried to yield 50 g of crude brominated polymer. The solids are redissolved in 441 g methylene chloride. The resulting solution is extracted twice with 400 g of deionized water. The brominated polymer is again precipitated in 2-propanol, and the precipitated polymer is filtered, washed with 2-propanol and dried. 46.6 g (90% yield) of brominated polymer is obtained. Proton NMR indicates that 97% of the butadiene units in the starting polymer have been brominated. Only 2.1% of the bromine is bonded to allylic or tertiary carbon atoms. The 5% WLT of the material is 259° C.

This experiment is repeated using only ethyl acetate as the reaction solvent. The 5% WLT is 264° C. and impurities are 1.1% by NMR, both values being comparable to those obtained using the n-butyl acetate/ethyl acetate mixture. However, only about 90% of the butadiene units are brominated. The use of the solvent mixture provides for significant higher levels of bromination under equivalent reaction conditions, while providing very similar levels of impurities and comparable thermal stability.

What is claimed is:

1. A process comprising brominating a butadiene polymer by contacting the butadiene polymer with a solution of a tribromide brominating agent selected from the group consisting of phenyltrialkylammonium tribromide, benzyltrialkylammonium tribromide, tetraalkylammonium tribromide and quaternary phosphonium tribromide, where the solution further comprises an n-butyl acetate/ethyl acetate solvent mixture, under conditions sufficient to brominate at least 85 percent of non-aromatic carbon-carbon double bonds in the butadiene polymer.

2. The process of claim 1 wherein the tribromide brominating agent is phenyltrimethylammonium tribromide, benzyltrimethylammonium tribromide, tetraethylammonium tribromide, tetrapropylammonium tribromide, tetra-n-butylammonium tribromide or a mixture of two or more thereof.

3. The process of claim 1 wherein the tribromide brominating agent is tetramethylphosphonium tribromide, tetraethylphosphonium tribromide, tetra(n-propyl)phosphonium tribromide, tetra(n-butyl)phosphonium tribromide, tetrahexylphosphonium tribromide, tetraoctylphosphonium tribromide, trihexyltetradecylphosphonium tribromide, and the like, or a mixture of two or more thereof.

4. The process of claim 3 wherein the brominated butadiene polymer is recovered by adding an antisolvent to the reaction mixture or a portion thereof to precipitate the brominated butadiene polymer from the solvent mixture.

5. The process of claim 3 wherein
   a. contacting the starting butadiene polymer with a solution of the quaternary ammonium or phosphonium tribromide in the n-butyl acetate/ethyl acetate solvent mixture under conditions such that the starting butadiene polymer and the quaternary ammonium tribromide react to produce a brominated butadiene polymer and a quaternary ammonium or phosphonium monobromide byproduct, and a solution or slurry of the brominated butadiene polymer in the solvent mixture is formed in the reaction,
   b. continuously or semi-continuously contacting the solution or slurry of the brominated butadiene polymer with an aqueous phase to form an aqueous quaternary ammonium or phosphonium monobromide solution or slurry and a washed solution or slurry of the brominated butadiene polymer, and
   c. continuously or semi-continuously contacting the aqueous quaternary ammonium or phosphonium monobromide solution or slurry obtained in step b with elemental bromine and a mixture of n-butyl acetate and ethyl acetate to form an aqueous raffinate stream and a solution of the quaternary ammonium or phosphonium tribromide in the mixture of n-butyl acetate and ethyl acetate, and
   d. recycling the quaternary ammonium or phosphonium tribromide solution obtained in step c into step a.

* * * * *